(12) United States Patent
Di Martino et al.

(10) Patent No.: US 10,669,924 B2
(45) Date of Patent: Jun. 2, 2020

(54) COOLANT PRESSURE REGULATOR SYSTEM

(71) Applicant: GM GLOBAL TECHNOLOGY OPERATIONS LLC, Detroit, MI (US)

(72) Inventors: Daniele Di Martino, Gragnano (IT); Giuseppe D'Aurizio, Lanciano (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/009,488

(22) Filed: Jun. 15, 2018

(65) Prior Publication Data
US 2019/0383203 A1 Dec. 19, 2019

(51) Int. Cl.
| | | |
|---|---|---|
| *F01P 11/02* | (2006.01) | |
| *F01P 3/20* | (2006.01) | |
| *F01P 7/14* | (2006.01) | |
| *F01P 5/12* | (2006.01) | |
| *B60K 11/02* | (2006.01) | |

(52) U.S. Cl.
CPC .............. *F01P 11/029* (2013.01); *F01P 3/20* (2013.01); *F01P 5/12* (2013.01); *F01P 7/14* (2013.01); *B60K 11/02* (2013.01); *F01P 2007/146* (2013.01); *F01P 2025/04* (2013.01); *F01P 2070/10* (2013.01)

(58) Field of Classification Search
CPC ........ F01P 11/029; F01P 11/0238; F01P 3/20; F01P 3/2207; F01P 5/12; F01P 7/14; F01P 7/165; F01P 2007/146; F01P 11/18; F01P 2070/06; B60K 11/02
See application file for complete search history.

(56) References Cited

U.S. PATENT DOCUMENTS

| | | | | |
|---|---|---|---|---|
| 8,065,980 B2* | 11/2011 | Dahl | ...................... | F01P 11/028 123/41.01 |
| 2002/0112678 A1* | 8/2002 | Langervik | ............. | F01P 3/2207 123/41.08 |
| 2011/0308484 A1* | 12/2011 | Peterson | ................... | F01P 3/20 123/41.44 |

* cited by examiner

Primary Examiner — Jacob M Amick
(74) Attorney, Agent, or Firm — Cantor Colburn LLP

(57) ABSTRACT

A coolant pressure regulator system includes a coolant circuit, and a pressurized fluid circuit selectively fluidically connected to the coolant circuit. The pressurized fluid circuit includes a pump operably to selectively raising a pressure of coolant in the coolant circuit.

12 Claims, 6 Drawing Sheets

COOLANT PRESSURE REGULATOR SYSTEM

INTRODUCTION

The subject disclosure relates to the art of vehicle cooling systems and, more particularly, to a coolant pressure regulator system for a vehicle.

Vehicles rely on a coolant system to regulate, to a wider temperature range, internal engine operating temperatures. Coolant systems typically include a pump that drives a flow of coolant through channels formed in an engine block and/or a cylinder head. After leaving the engine block and/or the cylinder head, the coolant flows through a radiator and passes in a heat exchange relationship with a flow of air. In most cases, the radiator includes a pressure relief cap that opens when the coolant reaches a predetermined pressure threshold. The pressure relief cap ensures that the coolant does not exceed a design pressure of the system.

The greater the temperature of the coolant, the less heat exchange is achieved. The coolant may only absorb a certain amount of heat from the engine. As a temperature of the coolant rises, the amount of heat that may be absorbed is reduced. Various fluids have been used as coolant. Fluids with higher boiling points are able to absorb more heat. It is desirable to maintain the coolant at temperatures far from the boiling point to increase heat exchange capabilities. Therefore, the industry would be receptive to systems that move the boiling point away from operating temperatures in a vehicle.

SUMMARY

In one exemplary embodiment, a coolant pressure regulator system includes a coolant circuit, and a pressurized fluid circuit selectively fluidically connected to the coolant circuit. The pressurized fluid circuit includes a pump operably to selectively raising a pressure of coolant in the coolant circuit.

In addition to one or more of the features described herein a pressure differential valve is fluidically connected to the pressurized fluid circuit downstream of the pump, the pressure differential valve including an inlet and an outlet, wherein the pressure differential valve opens when fluid pressure at the inlet exceeds fluid pressure at the outlet.

In addition to one or more of the features described herein a one-way valve is arranged between the pump and the pressure differential valve, the one-way valve allowing fluid flow from the pump to the pressure differential valve.

In addition to one or more of the features described herein a surge tank is fluidically connected to the outlet of the pressure differential valve.

In addition to one or more of the features described herein a liquid barrier valve is arranged between the surge tank and the pressure differential valve, the liquid barrier valve preventing liquid from the surge tank to the outlet of the pressure differential valve.

In addition to one or more of the features described herein a pressure relief valve is arranged between the surge tank and the outlet of the pressure differential valve.

In addition to one or more of the features described herein the pressure relief valve is fluidically connected to an inlet of the pump.

In addition to one or more of the features described herein a coolant pressure sensor is operatively connected to the surge tank and the pressure differential valve.

In addition to one or more of the features described herein the pressure differential valve comprises an electronic actuator operable to fluidically connect the pump and the surge tank based on signals from the coolant pressure sensor.

In addition to one or more of the features described herein the surge tank includes a membrane that forms a barrier isolating coolant from the coolant circuit from the pressure differential valve.

In addition to one or more of the features described herein the pump comprises a compressor portion of a turbine.

In accordance with another exemplary embodiment, a vehicle includes a body having an occupant compartment, a prime mover supported in the body, and a coolant pressure regulator system including a coolant circuit fluidically connected to the prime mover. A pressurized fluid circuit is selectively fluidically connected to the coolant circuit. The pressurized fluid circuit includes a pump operably to selectively raising a pressure of coolant in the coolant circuit.

In addition to one or more of the features described herein a pressure differential valve is fluidically connected to the pressurized fluid circuit downstream of the pump, the pressure differential valve including an inlet and an outlet, wherein the pressure differential valve opens when fluid pressure at the inlet exceeds fluid pressure at the outlet.

In addition to one or more of the features described herein a surge tank is fluidically connected to the outlet of the pressure differential valve.

In addition to one or more of the features described herein a liquid barrier valve is arranged between the surge tank and the pressure differential valve, the liquid barrier valve preventing liquid from the surge tank to the outlet of the pressure differential valve.

In addition to one or more of the features described herein a pressure relief valve is arranged between the surge tank and the outlet of the pressure differential valve.

In addition to one or more of the features described herein the pressure relief valve is fluidically connected to an inlet of the pump.

In addition to one or more of the features described herein a coolant pressure sensor is operatively connected to the surge tank and the pressure differential valve.

In addition to one or more of the features described herein the pressure differential valve comprises an electronic actuator operable to fluidically connect the pump and the surge tank based on signals from the coolant pressure sensor.

In addition to one or more of the features described herein the surge tank includes a membrane that forms a barrier isolating coolant from the coolant circuit from the pressure differential valve.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
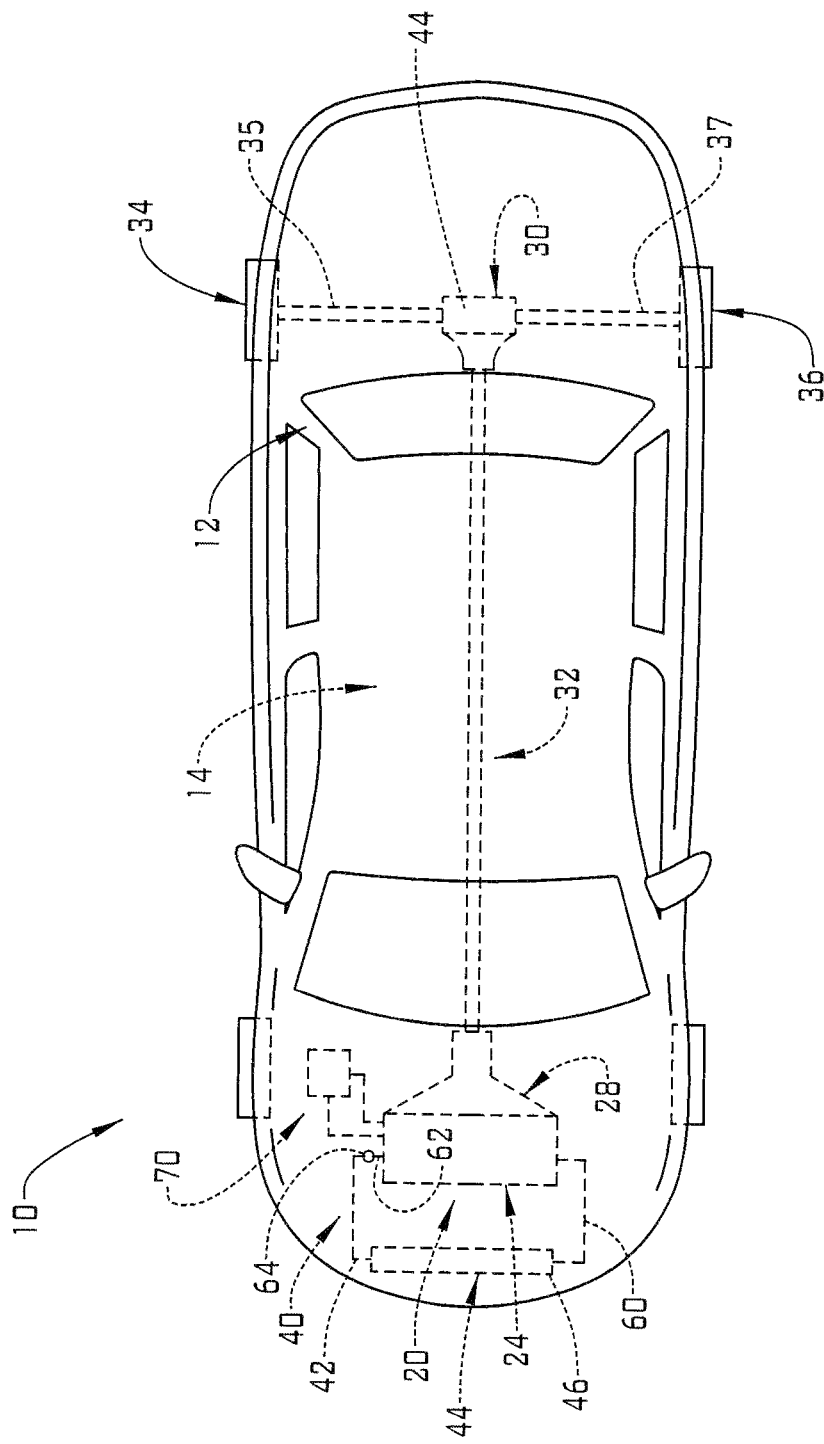
FIG. 1 depicts a vehicle including a coolant pressure regulator system, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features in the respective views.

A vehicle, in accordance with an exemplary embodiment, is indicted generally at 10 in FIG. 1. Vehicle 10 includes a body or chassis 12 that defines, at least in part, an occupant compartment 14. A prime mover 20 is arranged in chassis 12. Prime mover 20 may take the form of an engine or motor 24. Engine or motor 24 may take on various forms including internal combustion engines, hybrid engines, electric motors, or variations thereof. Prime mover 20 is operatively connected to a transmission 28 which, in turn, is mechanically linked to a rear differential or rear drive module (RDM) 30 through a propshaft 32. RDM 30 transfers power from prime mover 20 to a first wheel 34 through a first axle 35 and to a second wheel 36 through a second axle 37. While shown as a rear wheel drive system, it should be understood that exemplary embodiments also contemplate front wheel drive systems and four wheel drive systems.

Vehicle 10 includes a cooling system 40 fluidically connected to prime mover 20. Cooling system 40 includes a coolant circuit 42 that carries a flow of coolant (not shown) passing from prime mover 20 through a heat exchanging member 44 such as a radiator 46. The coolant passes from an outlet 60 of prime mover 20 through radiator 46 back into prime mover 20 via an inlet 62. A one-way valve 64 is arranged upstream of inlet 62 to prevent reverse flow. The coolant may be driven by, for example, a water pump (also not shown) operatively connected to prime mover 20.

In accordance with an aspect of an exemplary embodiment, vehicle 10 includes a coolant pressure regulator system 70 that is fluidically connected to a turbocharger or compressor 80 (FIG. 2) and coolant circuit 42. It should be understood that coolant circuit 42 circulates a liquid coolant (not shown) through prime mover 20 in order to reduce operating temperatures. Coolant pressure regulator system 70 selectively raises a pressure of liquid coolant flowing through prime mover 20. By raising coolant pressure, a boiling point of the coolant increases thereby increasing an overall heat carrying capacity. In this manner, the coolant may absorb more heat from prime mover 20 during certain selected operating stages.

Figure 2:
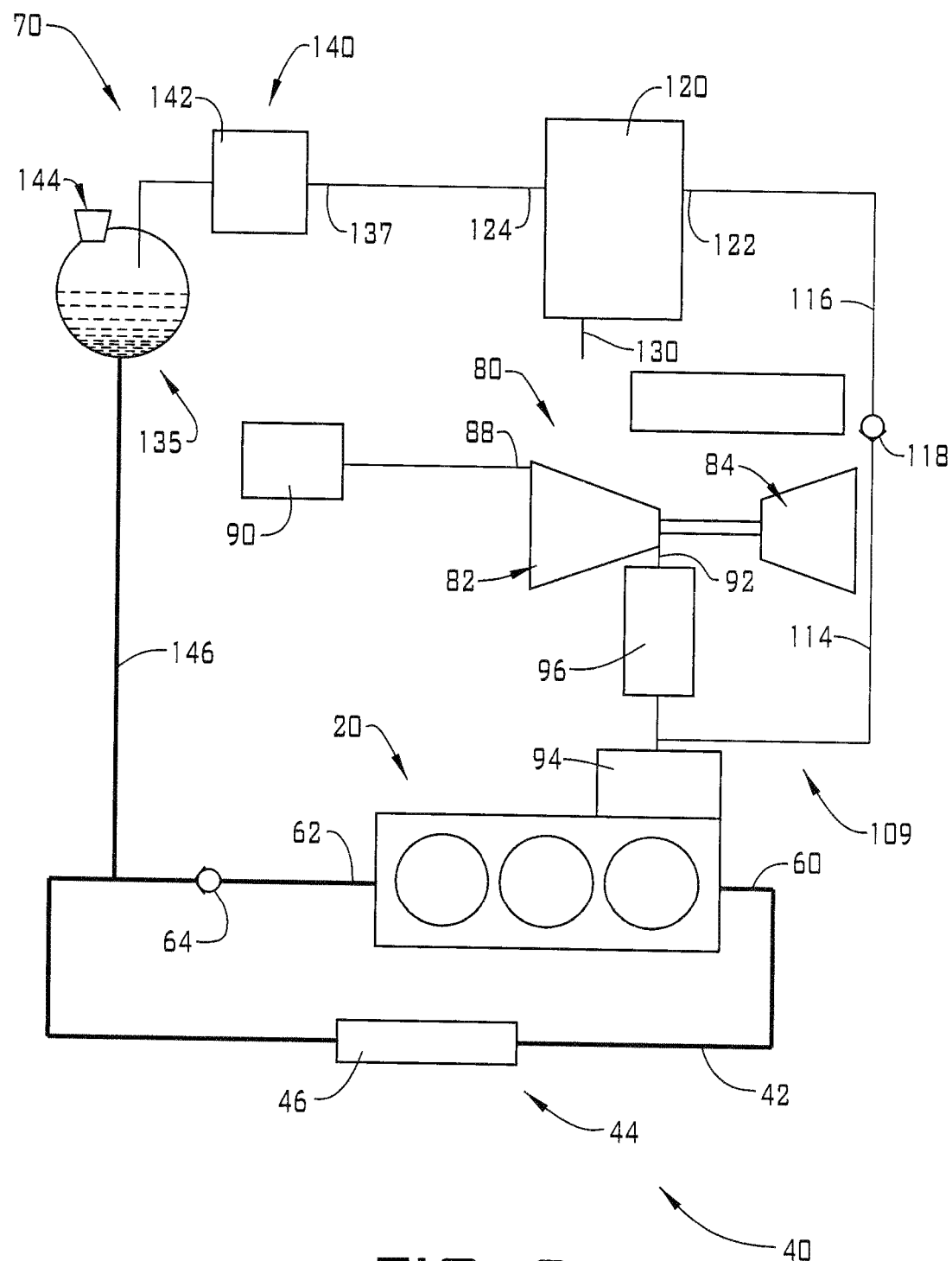
FIG. 2 depicts a coolant pressure regulator system, in accordance with an aspect of an exemplary embodiment.

Referring to FIG. 2 turbo 80 includes a compressor portion 82 and a turbine portion 84. Compressor portion 82 includes an inlet 88 fluidically connected to an air filter 90 and an outlet 92 that may be connected to an intake manifold 94 of prime mover 20. In an embodiment, outlet 92 may be connected to intake manifold 94 through a water charge air cooler (WCAC) that reduces a temperature of fluid passing from compressor 82 into prime mover 20.

In an embodiment, coolant pressure regulator system 70 includes a pressurized fluid circuit 109 fluidically connected to outlet 92 of compressor portion 82 and coolant circuit 42 of cooling system 40. It should be understood that pressurized fluid circuit 109 employs a flow of pressurized fluid, typically in the form of compressed air produced by compressor 80 to selectively adjust a pressure of the liquid coolant flowing through coolant circuit 42. Pressurized fluid circuit 109 includes a first line portion 114 that extends from outlet 92 to a second line portion 116 through a one-way valve 118. Second line portion 116 fluidically connects with a pressure differential valve 120 having an inlet 122, an outlet 124 and an ambient line 130. Inlet 122 is coupled to second line portion 116 and outlet 124 is fluidically connected to a surge tank 135 via a third line portion 137. Ambient line 130 provides ambient pressure data to pressure differential valve 120.

Third line portion 137 supports a liquid barrier valve 140 that may take the form of a ball cage valve 142. Liquid barrier valve 140 prevents coolant that may be in the form of a liquid, in surge tank 135 from passing back into pressure differential valve 120 via outlet 124. In the embodiment shown, surge tank 135 includes a pressure relief mechanism 144. Pressure relief mechanism is calibrated to open if pressure in surge tank 135 exceeds a preset limit. Pressurizing fluid circuit 109 includes a fourth line portion 146 that fluidically connects surge tank 135 with inlet 62 of prime mover 20. Fourth line portion 146 connects with inlet 62 downstream of one-way valve 64.

In operation, coolant pressure regulation system 70 includes at least two operating modes. In a first or active mode, pressurized fluid, in the form of compressed air, is introduced into coolant system 40. In the first mode, the coolant is typically not at operating temperatures. As such fluid pressure, e.g., compressed air, in first line portion 114 and at inlet 122 of pressure differential valve is greater than fluid pressure at outlet 124. Fluid pressure at outlet 124 represents a pressure of the liquid coolant. In this condition, pressure differential valve 120 opens allowing pressurized air to flow into surge tank 135 elevating a pressure of the coolant in coolant system 40.

In a second mode, the coolant warms and increases in pressure. When pressure at outlet 124 substantially equals pressure at inlet 122 and pressure in first line portion 114, pressure differential valve 120 closes allowing more air to flow from compressor portion 82 into intake manifold 94 to enhance operating efficiencies.

Figure 3:
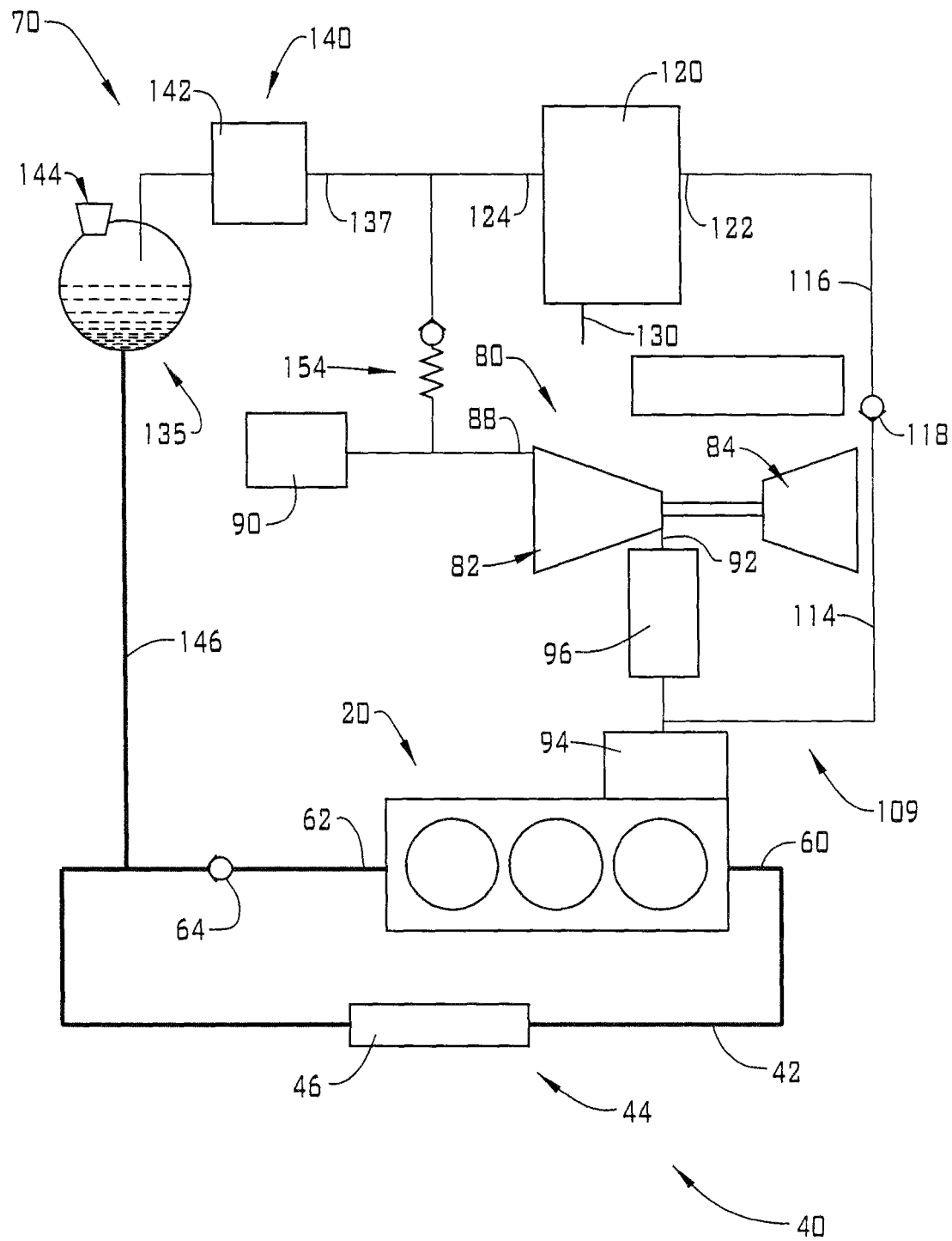
FIG. 3 depicts a coolant pressure regulator system, in accordance with another aspect of an exemplary embodiment.

Pressure regulation system 70 may also operate in a third mode illustrated in FIG. 3. In an embodiment, pressure regulation system 70 also includes a pressure relief valve 154 fluidically connected with third line portion 137. Pressure relief valve 137 is calibrated to open if pressure in third line portion 137 at outlet 124 is greater than pressure in second line portion 116 and first line portion 114. In this mode, pressure regulation system 70 discharges pressure to, for example, compressor inlet 88.

Figure 4:
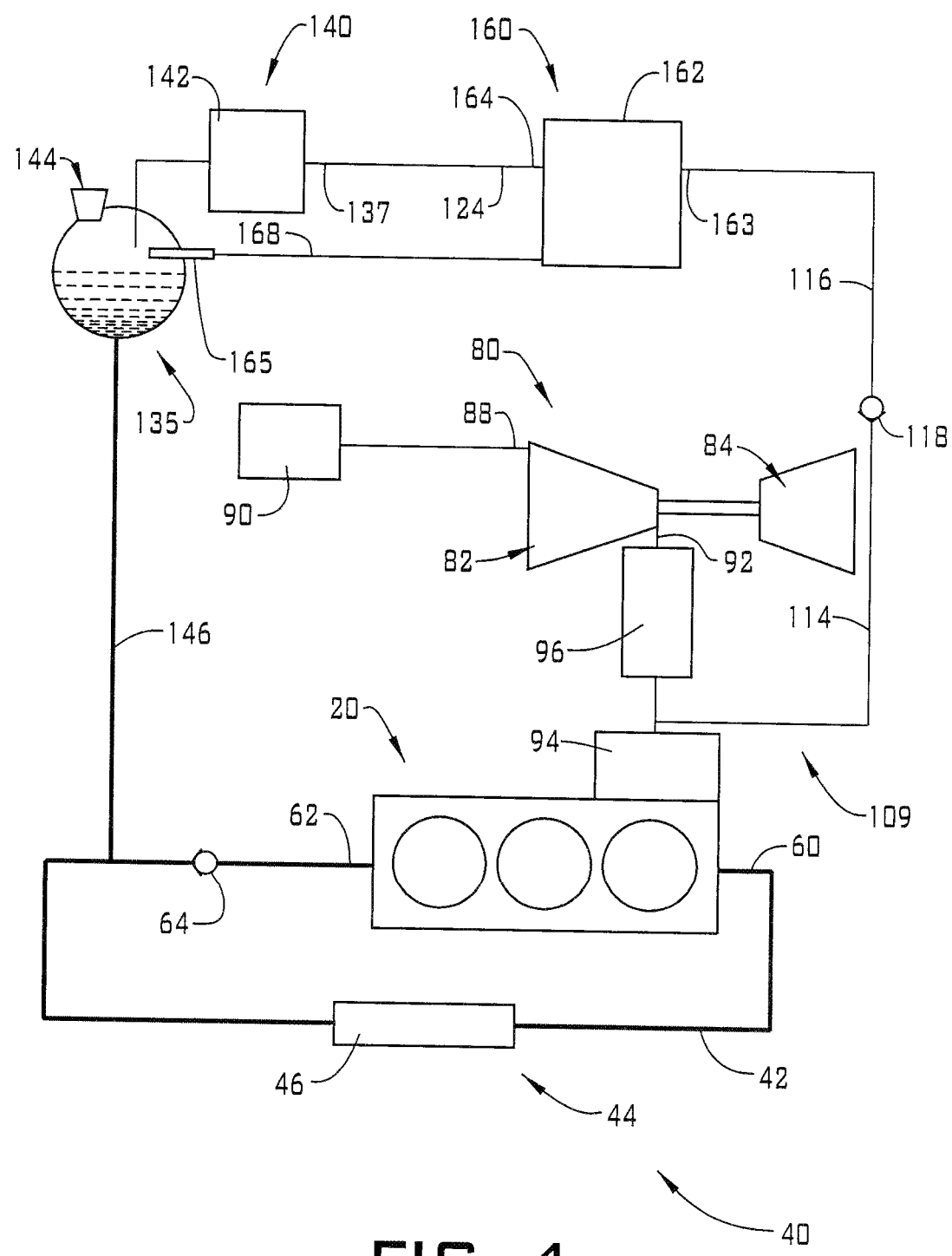
FIG. 4 depicts a coolant pressure regulator system, in accordance with yet another aspect of an exemplary embodiment.

Reference will now follow to FIG. 4 in describing a pressure differential valve 160 in accordance with another exemplary aspect. Pressure differential valve 160 takes the form of an electronic actuator valve 162 that is set to open and closed in response to a selected pressure signal. Pressure differential valve 160 includes an inlet 163 fluidically connected with second line portion 116 and an outlet 164 fluidically connected with third line portion 137. In an embodiment, surge tank 135 includes a coolant pressure sensor 165 operatively connected to electronic actuator valve 162. Coolant pressure sensor 165 senses coolant pressure in surge tank 135.

In operation, pressure differential valve 160 changes position, e.g., open/closed, based on coolant pressure sensed in surge tank 135. For example, pressure differential valve 160 may open if coolant pressure sensor 165 determines coolant pressure is less than a predetermined selected threshold value of compressor outlet pressure.

Figure 5:
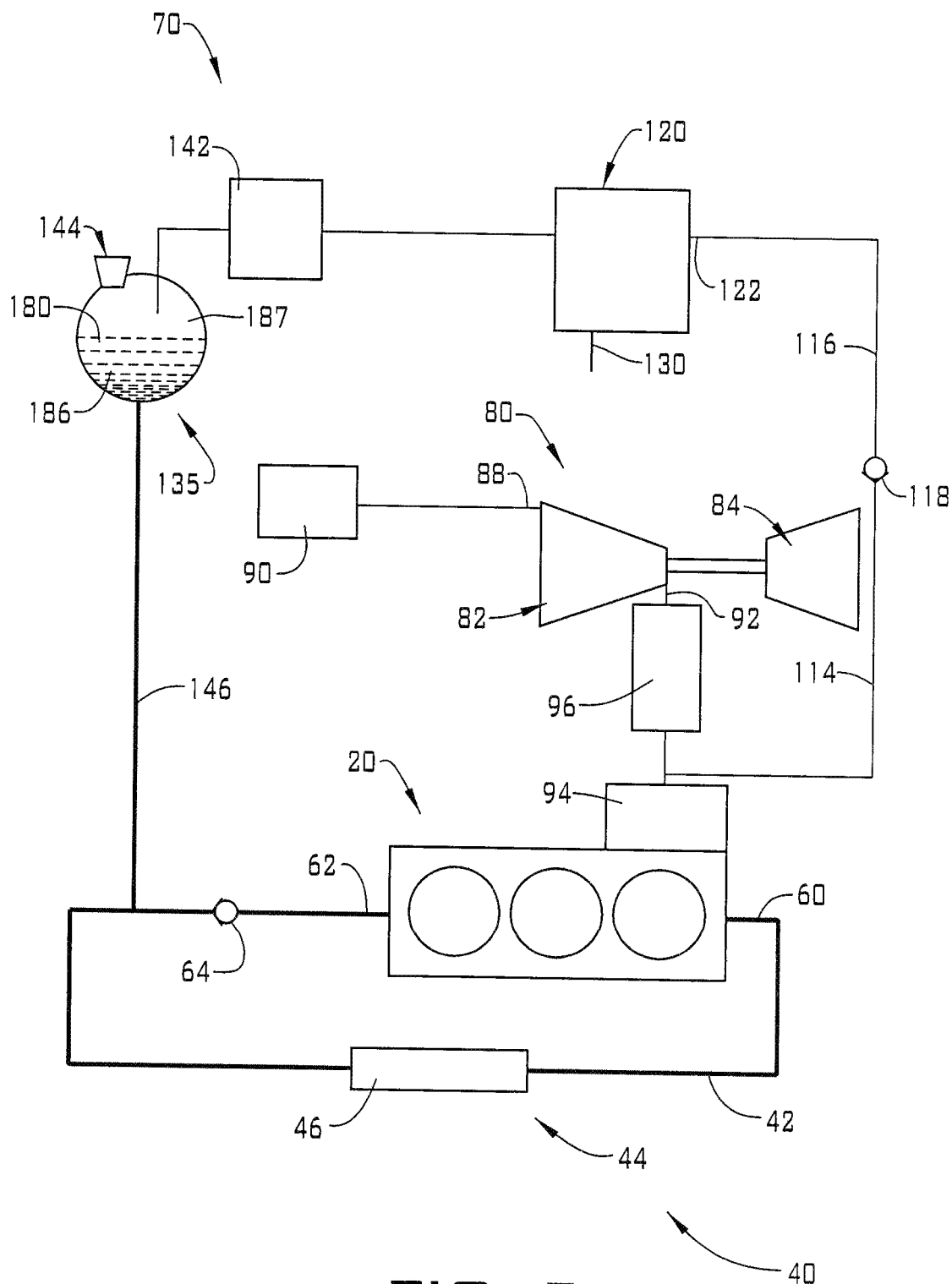
FIG. 5 depicts a coolant pressure regulator system, in accordance with still yet another aspect of an exemplary embodiment.

Reference will now follow to FIG. 5 in describing another exemplary aspect of coolant pressure regulating system 70. Surge tank 135 is provided with a membrane 180. Membrane 180 separates an internal volume (not separately labeled) of surge tank 135 into a liquid coolant portion 186 and a coolant pressure portion 187. In this manner, compressor portion 82 may increase a pressure of coolant in coolant circuit 42 without the need for a liquid barrier valve.

Figure 6:
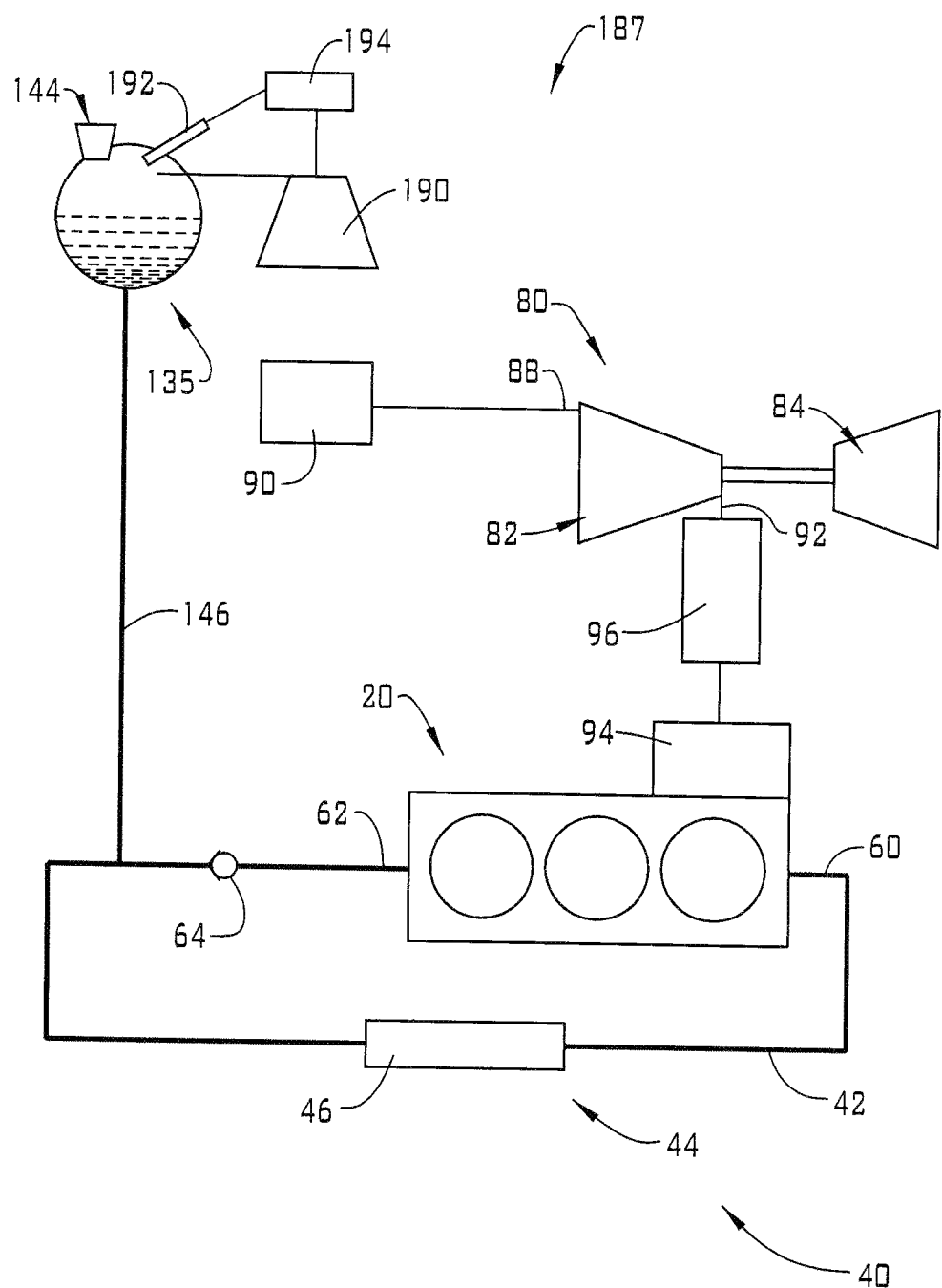
FIG. 6 depicts a coolant pressure regulator system, in accordance with yet still another aspect of an exemplary embodiment.

FIG. 6 depicts a coolant pressure regulator system 187 in accordance with another aspect. Instead of employing a compressor portion of a turbocharger as a source of pressure, a separate pump 190 is fluidically connected to surge tank 135. Pump 190 may include an inlet (not separately labeled) that is connected to air filter 90, and an outlet (also not separately labeled) connected to surge tank 135. A coolant pressure sensor 192 is provided on surge tank 135 and operable to detect a pressure of coolant in coolant circuit 42. A pump controller 194 may be connected between pump 190 and coolant pressure sensor 192. Pump controller 194 may activate pump 190 when pressure in surge tank 135 reaches a predetermined value relative to design pressure. In this manner, pump controller 194 functions as a differential pressure valve in a manner similar to that described herein.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A coolant pressure regulator system comprising:
a coolant circuit; and
a pressurized fluid circuit selectively fluidically connected to the coolant circuit, the pressurized fluid circuit including a pump including an inlet portion and an outlet portion operable to selectively raise a pressure of coolant in the coolant circuit;
a pressure differential valve fluidically connected to the pressurized fluid circuit downstream of the pump, the pressure differential valve including an inlet and an outlet, wherein the pressure differential valve opens when fluid pressure at the inlet exceeds fluid pressure at the outlet;
a surge tank fluidically connected to the outlet of the pressure differential valve; and
a pressure relief valve arranged between the surge tank and the outlet of the pressure differential valve, wherein the pressure relief valve is connected to inlet portion of the pump through a conduit.

2. The coolant pressure regulator system according to claim 1, further comprising: a one-way valve arranged between the pump and the pressure differential valve, the one-way valve allowing fluid flow from the pump to the pressure differential valve.

3. The coolant pressure regulator system according to claim 1, further comprising: a liquid barrier valve arranged between the surge tank and the pressure differential valve, the liquid barrier valve preventing liquid from the surge tank entering into the outlet of the pressure differential valve.

4. The coolant pressure regulator system according to claim 1, further comprising: a coolant pressure sensor operatively connected to the surge tank and the pressure differential valve.

5. The coolant pressure regulator system according to claim 4, wherein the pressure differential valve comprises an electronic actuator operable to fluidically connect the pump and the surge tank based on signals from the coolant pressure sensor.

6. The coolant pressure regulator system according to claim 1, wherein the surge tank includes a membrane that forms a barrier isolating liquid coolant in the coolant circuit from the pressure differential valve.

7. The coolant pressure regulator system according to claim 1, wherein the pump comprises a compressor portion of a turbocharger.

8. A vehicle comprising:
a prime mover;
a coolant pressure regulator system including a coolant circuit fluidically connected to the prime mover, and
a pressurized fluid circuit selectively fluidically connected to the coolant circuit, the pressurized fluid circuit including a pump operable to selectively raising a pressure of coolant in the coolant circuit;
a pressure differential valve fluidically connected to the pressurized fluid circuit downstream of the pump, the pressure differential valve including an inlet and an outlet, wherein the pressure differential valve opens when fluid pressure at the inlet exceeds fluid pressure at the outlet;
a surge tank fluidically connected to the outlet of the pressure differential valve; and
a pressure relief valve arranged between the surge tank and the outlet of the pressure differential valve, wherein the pressure relief valve is connected to inlet of the pump through a conduit.

9. The vehicle according to claim 8, further comprising: a liquid barrier valve arranged between the surge tank and the pressure differential valve, the liquid barrier valve preventing liquid from the surge tank to the outlet of the pressure differential valve.

10. The vehicle according to claim 8, further comprising: a coolant pressure sensor operatively connected to the surge tank and the pressure differential valve.

11. The vehicle according to claim 10, wherein the pressure differential valve comprises an electronic actuator operable to fluidically connect the pump and the surge tank based on signals from the coolant pressure sensor.

12. The vehicle according to claim 8, wherein the surge tank includes a membrane that forms a barrier isolating coolant from the coolant circuit from the pressure differential valve.

* * * * *